United States Patent [19]

Vajapey

[11] Patent Number: 5,699,554
[45] Date of Patent: Dec. 16, 1997

[54] APPARATUS FOR SELECTIVE OPERATION WITHOUT OPTIONAL CIRCUITRY

[75] Inventor: Sridhar Vajapey, Sugarland, Tex.

[73] Assignee: Texas Instruments Incorporated, Dallas, Tex.

[21] Appl. No.: 329,917

[22] Filed: Oct. 27, 1994

[51] Int. Cl.⁶ .................. G06F 3/00; G01R 31/28
[52] U.S. Cl. .................. 395/500; 395/828; 395/183.04; 395/183.08; 395/800; 371/22.1; 371/22.5; 371/25.1; 364/488
[58] Field of Search .................. 395/500, 800, 395/183.04, 183.06, 828, 568, 591, 285, 306, 309, 582, 652, 502–509, 521, 183.01–183.08; 365/189.09, 226, 229, 201, 200, 189.02, 230.03; 364/578, 550, 571.01, DIG. 2, DIG. 1, 488, 489; 371/21.1, 10.3, 22.3, 22.1, 25.1, 22.5, 51.1; 340/825.31, 825.34; 377/2, 31–33

[56] References Cited

U.S. PATENT DOCUMENTS

| 4,250,563 | 2/1981 | Struger | 395/800 |
|---|---|---|---|
| 4,277,827 | 7/1981 | Carlson et al. | 395/500 |
| 4,458,357 | 7/1984 | Weymouth et al. | 395/800 |
| 4,527,234 | 7/1985 | Bellay | 395/500 |
| 4,674,089 | 6/1987 | Poret | 371/25 |
| 4,807,161 | 2/1989 | Comfort et al. | 364/571.01 |
| 4,939,637 | 7/1990 | Pawloski | 395/800 |
| 5,134,617 | 7/1992 | McRoy | 395/183.08 |
| 5,191,657 | 3/1993 | Ludwig et al. | 395/500 |
| 5,203,004 | 4/1993 | Bonton et al. | 395/800 |
| 5,261,115 | 11/1993 | Saunders et al. | 395/800 |
| 5,276,831 | 1/1994 | Nakanishi et al. | 395/800 |
| 5,293,636 | 3/1994 | Bonton et al. | 395/800 |
| 5,321,814 | 6/1994 | Barajas et al. | 395/828 |
| 5,325,490 | 6/1994 | Brasseur | 395/309 |
| 5,327,567 | 7/1994 | Johnson | 395/500 |
| 5,329,471 | 7/1994 | Swoboda et al. | 395/500 |
| 5,355,489 | 10/1994 | Bealkowski et al. | 395/500 |
| 5,408,637 | 4/1995 | Shimiza | 395/800 |
| 5,450,570 | 9/1995 | Richek et al. | 395/500 |
| 5,463,589 | 10/1995 | Gruender, Jr. et al. | 395/650 |

Primary Examiner—Jacques Louis-Jacques
Attorney, Agent, or Firm—Gerald E. Laws; C. Alan McClure; Richard L. Donaldson

[57] ABSTRACT

An integrated circuit is provided having a core circuit for performing a plurality of functions, a first pad for receiving an emulator output signal, a pulldown device connected to said first pad, a first logic circuit having an input connected to said first pad and an output signal for enabling emulator signals, a first plurality of second pads for receiving emulator signals, and a first plurality of second logic circuits with each circuit having a first input individually connected to one of said second pads, having a second input connected to said output signal from said first logic circuit, and having an output connected to a portion of said core circuit.

9 Claims, 3 Drawing Sheets

5,699,554

APPARATUS FOR SELECTIVE OPERATION WITHOUT OPTIONAL CIRCUITRY

TECHNICAL FIELD OF THE INVENTION

The present invention relates to the field of electronic circuitry, and more particularly, to electronic circuitry for automatically detecting the presence of emulation circuitry.

BACKGROUND OF THE INVENTION

System emulators are commonly used to assist programmers in the development of software for various microprocessor and microcontroller based systems. Microcontrollers typically do not provide the degree of visibility or accessibility to the internal workings of its system that a microprocessor does. For example, a microcontroller may not present the data and addresses found on internal buses to the external pins of the device. However, such signals are important to a person designing software for such a system.

Further, even microprocessors may have some signals that are important to the software designer that are not provided to external pins. A good system emulator needs to provide the necessary signals to the designer. Typically, this is accomplished by using the actual microcontroller or microprocessor with additional on-chip circuitry or logic for performing the necessary emulation functions.

This on-chip emulation circuitry or logic assists with the integration of the circuitry on a chip into new systems by providing special emulation features that give powerful capabilities to the system designer for debugging application programs. However, these features are used only in a special test environment by the system designer. End users of the system do not normally require these features. Because of the cost penalties associated with the extra silicon area required to implement this emulation logic, any such emulation logic is normally not included in production chips.

Typically, emulation circuitry or logic works together with the production chip's control and/or signal logic or circuitry to produce the special debug features. The physical implementation of the emulation logic must be such that it can be removed without having a major impact on the mask geometries of the production chip logic; that is, physically removing the emulation logic must be accomplished in a manner that minimizes any redesign of the basic functional logic or circuitry. Typically the emulation logic is placed or contained in a self-contained module on a chip and wired to the rest of the chip. However, this still requires modification to the production chip logic wherever there are inputs from the emulation logic.

Since emulation signals don't exist when the emulation logic or circuitry is not present and/or connected, these signals must be tied off, or eliminated with new circuitry modifications in most design environments. However, when the production core is "touched" in any way, time consuming verification procedures must be implemented to re-verify the "modified" design.

Thus, there are still unmet needs for circuitry capable of automatically detecting the presence or absence of emulator circuitry and responding appropriately without modifying the design of a production core.

SUMMARY OF THE INVENTION

According to one aspect of the present invention, an automatic emulator detection circuit is provided. In a presently preferred embodiment, an integrated circuit is provided having a core circuit for performing a plurality of functions, a first pad for receiving an emulator output signal, a pulldown device connected to said first pad, a first logic circuit having an input connected to said first pad and an output signal for enabling emulator signals, a first plurality of second pads for receiving emulator signals, and a first plurality of second logic circuits with each circuit having a first input individually connected to one of said second pads, having a second input connected to said output signal from said first logic circuit, and having an output connected to a portion of said core circuit.

The present invention provides circuitry for automatically detecting the presence or absence of emulator circuitry.

The present invention also provides a method for automatic detection of on-chip emulation logic, so that the design of a production core module of a chip is not affected at all by the existence or non-existence of any emulation logic.

The present invention also provides a system for independence between the physical implementation of emulation circuitry or logic and a production core's circuitry that eliminates or minimizes any chip redesigns.

The present invention provides a method for determining the existence of any on-chip emulation logic.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

The present invention provides circuitry capable of automatic detection of the presence or absence of emulator circuitry, and for appropriately responding to such emulator circuitry without modifying the design of a production core.

Figure 1:
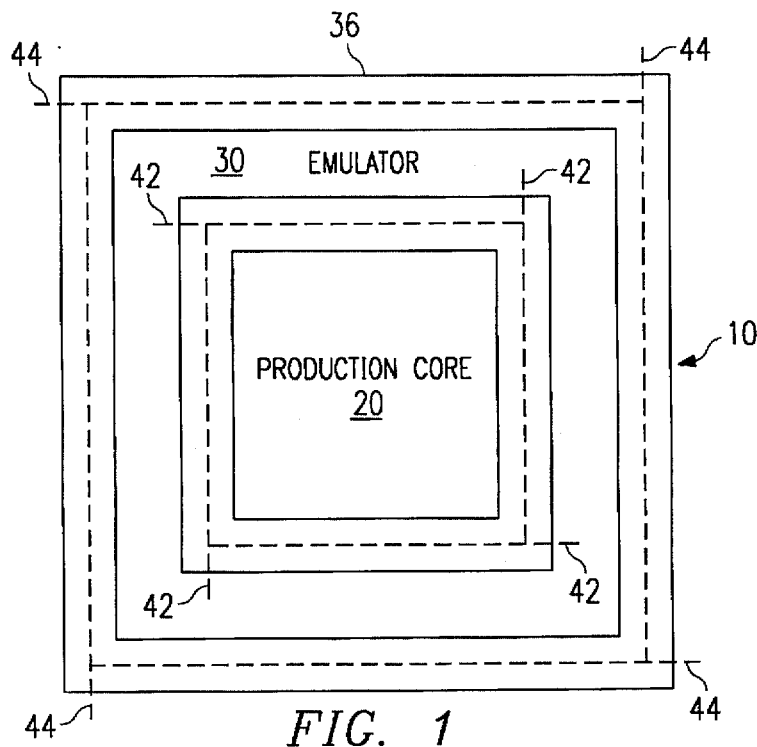
FIG. 1 depicts a schematic illustration of portions of a mask set used to fabricate a chip with or without emulation circuitry.

Referring now to FIG. 1, there may be seen a depiction of a chip 10 that includes a production core portion 20 and an emulator circuitry portion 30 as parts of a mask set used to fabricate the chip 10. The chip 10 may be fabricated to include the emulator portion 30 by using a reticle 36, indicated by dashed lines 44, that exposes both portions 20, 30. Alternatively, the chip 10 may be fabricated to only include the production core 20 by using the smaller reticle 36, indicated by dashed lines 42. This is accomplished when the shutter in a conventional photolithographic system is opened to the positions corresponding to either 42 or 44 to expose the desired portions on the surface of a semiconductor wafer.

FIG. 1 is presented solely for the purposes of teaching the present invention and should not be construed to limit the present invention to the exemplary embodiment depicted in FIG. 1.

Figure 2:
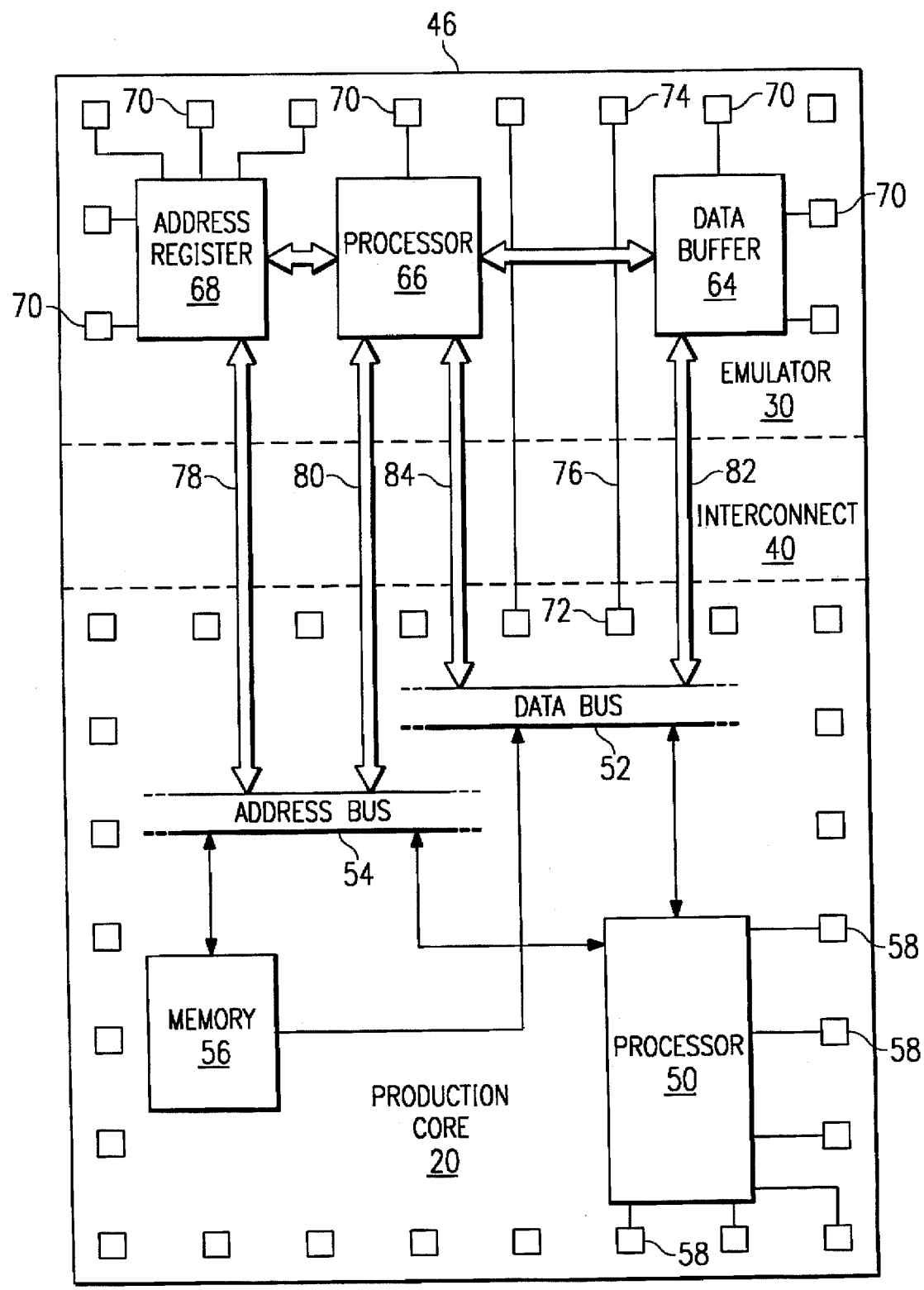
FIG. 2 depicts a functional block diagram of the organization of a system emulator.

Referring now to FIG. 2, there may be seen a block diagram of an exemplary system emulator 46 constructed in accordance with the teachings of the present invention. More particularly, a production core 20 is illustrated as having a processor 50, a memory 56, a data bus 52 and an address bus 54 appropriately interconnected. Production core 20 is also depicted as having a plurality of input/output pads 58 located around the periphery of core 20.

Continuing to refer to FIG. 2, a system emulator 30 and its associated interconnect circuit 40 are also depicted. Interconnect circuit 40 comprises a plurality of conductive interconnect paths between emulator circuit 30 and core 20; these paths may be conductive layers of semiconductor materials or metal semiconductor layers, or any other type of conductive interconnection. Emulator circuit 30 is depicted as having a data buffer 64, a processor 66, and an address register 68 appropriately interconnected. The emulator circuit 30 depicted is solely for the purposes of teaching the present invention and should not be construed to limit the scope of the present invention. That is, emulator circuit 30 may contain any combination of integrated circuitry necessary for efficient and sufficient emulation of and interaction with the core 20. As depicted in FIG. 2, the data buffer 64, processor 66, and address register 68 may be coupled to exemplary input/output pads 70.

Interconnect circuit 40 may serve to directly couple input/output pads of core 20 to input/output pads of emulator circuit 30. For example, as shown in FIG. 2, input/output pad 72 of core 20 is directly coupled to input/output pad 74 of emulator 30 through conductive interconnect 76. Conductive interconnects 78 and 80 serve to couple address bus 54 within core 20 to the address register 68 and processor 66, respectively, within emulator circuit 30. Similarly, conductive interconnect 82 serves to couple data bus 52 within core 20 to the data buffer 64 within emulator 30, and conductive interconnect 84 serves to couple data bus 52 to processor 66 within the emulator circuit 30.

As noted earlier, integrated microcontrollers have large amounts of signal processing that are totally internal to the device. For example, some devices contain all the memory necessary for the operation of the system on the chip. As such, the data and address buses do not need to be visible or accessible to the external operating environment, since they serve to couple the processor to the internal memory and are not needed by or available to external processes. A programmer attempting to develop software for such a system that uses internal signaling of this sort must have the capability to monitor the data and address signals during operation of the system emulator. The interconnect circuit 40 depicted in FIG. 2 allows for such access without rerouting these signals to external pads or pins of core 20. This architecture allows the system emulator 30 to maintain the exact layout of the core 20 while adding or subtracting the system emulator circuitry resident in emulator circuit 30.

The present invention, by providing circuitry and a method for automatic detection of any on-chip emulation logic 30, allows the design of a production core module 20 of a chip 10 to be unaffected by the existence or non-existence of any such emulation logic 30. The independence between the physical implementation of the emulation circuit 30 and production core 20 is exploited by the present invention to eliminate or minimize any chip redesign. That is, both the emulator 30 and core 20 may be separate modules placed on an emulation chip and appropriately interconnected. On the production chip, the emulation module 30 is removed (not installed), but with no extra redesign effort necessary for the production module 20 because floating signals from the emulator are automatically taken care of. This not only minimizes costs in added design time, but also provides a quicker time to market since no redesign is needed.

Figure 3:
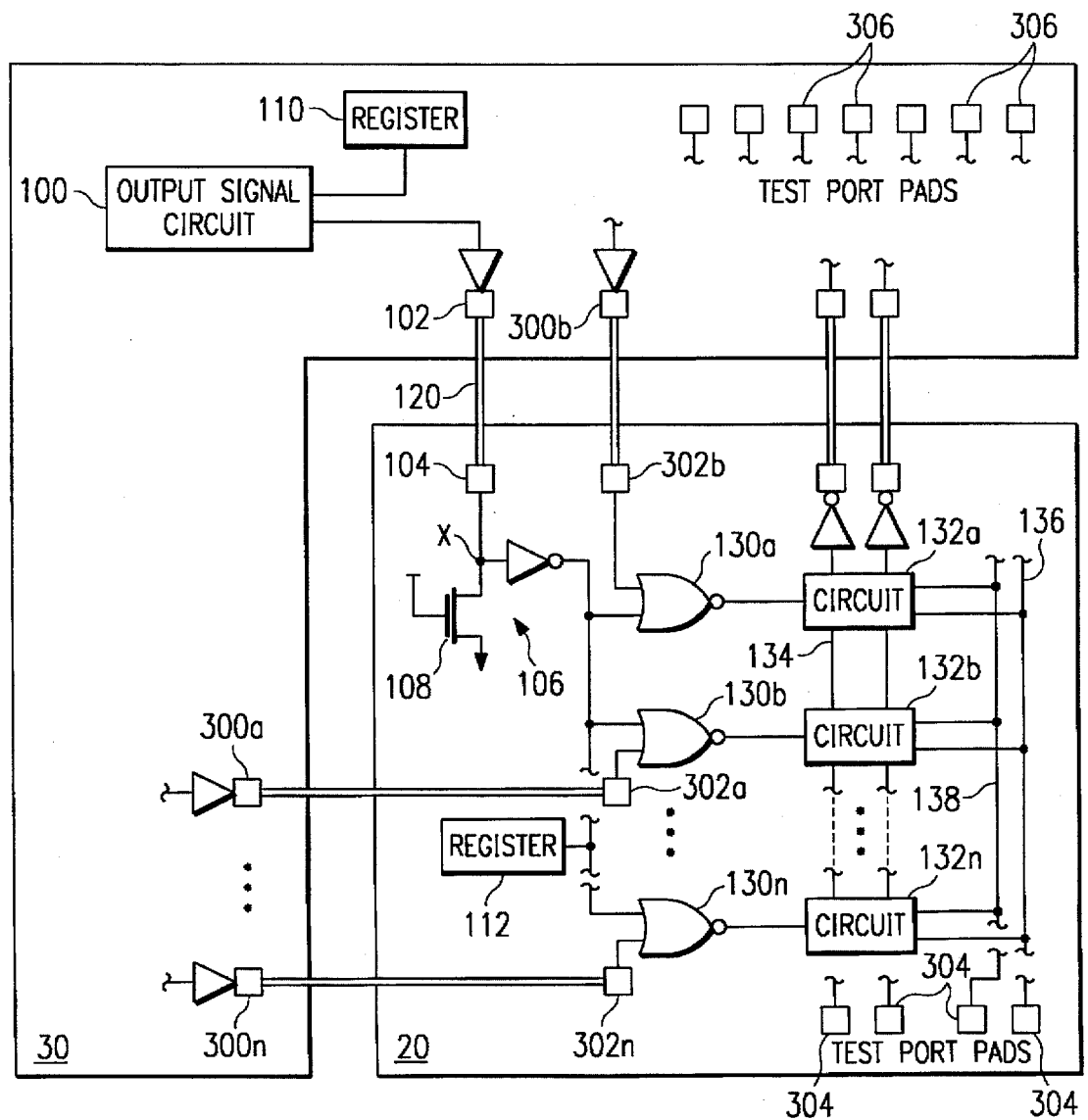
FIG. 3 depicts a simplified functional block diagram of the organization of a system emulator that includes a detection circuit and other circuits of the present invention.

Referring now to FIG. 3, there may be seen a simplified diagram of a presently preferred detection circuit and other circuits of the present invention for use in a system emulator similar to that depicted in FIG. 2. The emulator 30 and core 20 are depicted as a single integrated circuit with two active regions and interconnects between the two regions; the core 20 and emulator 30 are depicted differently in FIG. 3 from FIG. 2 to provide another alternative representation of both being on a single integrated circuit or chip. The present invention is preferably employed with single chips but may also be employed with multiple chips.

More particularly, it may be seen that an output signal from an output signal circuit 100 in the emulator circuit 30 is supplied to an output pad 102 on the emulator portion of the chip or integrated circuit. Preferably, this output signal is a logic high (or active high) when the emulator circuit 30 is present; that is, this output signal is an emulator "presence" signal. An appropriate conductive path 120 is connected from the output pad 102 to an input pad 104 associated with core 20. The input pad 104 is connected to the input of a first logic circuit 106 also associated with the core 20.

The output signal generated by circuit 100 in the emulator circuit 30 is preferably high whenever the emulator circuit 30 is present. When not present, the emulator output signal, as seen by the input pad 104 and first logic circuit 106, is floating. The drain of a very small pulldown transistor 108 (preferably about 2 um wide by 30 um in length) is attached to the input to the input logic circuit 106 at point x in FIG. 3 which provides a resistive path to ground; any other type of weak pulldown device 108 may be so employed in the circuitry of the present invention. Further, this low power device may also be a pullup device depending upon the desired active value of the output signal; that is, the low power device is selected to provide a preselected output value. Similarly, the remaining logic may be suitably adjusted for the selected active value of the output signal.

This pulldown transistor or device 108 serves to ground the input signal when the output signal is not driven high by the emulator circuit 30. When the output signal is driven high, it easily overpowers the weak pulldown device 108, and provides a high signal. A weak pulldown device 108 is utilized so that it may be overcome by the output signal from the emulator 30 and so that it consumes the minimum amount of power when the emulation circuit 30 is not present and the device is used to pull the input to the input logic circuit 106 to a logic low.

An additional circuit and/or register 110 may optionally be employed in the emulator circuit 30 to allow for the output signal to be turned "off" even when the emulator circuit 30 is present. That is, a bit in register 110 may be set by software to allow the output signal to be sent to the core 20, or to prevent the sending of the output signal to the core 20, even when the emulator 30 is present. This may be accomplished by having the bit control the output circuit 100, or in any other convenient manner. This allows code that has been written to be tested in the core 20 as if the emulator 30 were not present; this may be useful to ensure that the code is not dependent upon the emulator circuit 30 to properly operate. The bit so employed may be part of a memory mapped register or a register that may be read and/or written to by an emulator processor, if present, or an external processor. Preferably, the contents of register 110 are accessible by at least an external processor.

The output signal from the first logic circuit 106 may be routed throughout the production core 20 to wherever its control logic requires inputs from the emulator circuit 30. For ease of illustration purposes several of the emulator input signal positions (from emulator output pads 300a–300n to core input pads 302a–302n) in FIG. 3 have been omitted and their omission indicated with a dashed or dotted line. This output signal from the first logic circuit 106 acts to enable these various emulation input signals when emulator circuit 30 is present, but otherwise disables them. This is also illustrated in FIG. 3 by use of NOR gates 130a–130n having as one input the output signal of the first logic circuit 106 and a second input which is an input or control signal from emulator 30, via one of pads 300a–300n and their interconnects with pads 302a–302n; that is, the outputs of the NOR gates 130 are unconditionally driven low thereby disabling the emulation input signals. Again, other types of logic circuits, such as, for example, but not limited to NAND gates, with appropriate inversions, may be so employed. Again, output pads 300a–300n on the emulator 30 serve to provide the desired signals from the emulator 30 to input pads 302a–302n on core 20 via an appropriate conductive interconnections.

One input of each of the NOR gates 130 is forced high via circuit 106 when there is no emulator circuit 30. Therefore, the emulation input signals may by floating and not cause any operational problems for the core 20; that is, this logic eliminates any floating nodes and eliminates any DC current paths that would otherwise be required if the emulation signals were not overridden. This allows the physical location of the emulator circuit 30 to be independent from the production core 20. The flexibility exists to either route the emulation inputs to the edge of the production module, or preferably use a higher metal level to make the connections internally to the production core 20. Either way, the production core module 20, once completed, does not require any rework to place or remove the emulation module.

The outputs of the NOR gates 130 may be supplied to various circuits 132a–132n used by the core 20. The circuits 132 may be appropriately interconnected via lines 134 and may be interconnected via different buses 136 and 138. These emulator signals are used to control these circuits 132 when the core 20 is in an emulation mode of operation. However, these signals may be control or input signals. In a similar manner, output signals from the core 20 may be supplied to the emulator 30, and/or input/output signals may be passed between the emulator 30 and core 20. Using such output signals, it is easy to monitor the core 20 when it is in a normal operation mode; this may be accomplished even when the emulator is present by "telling" the core 20, via register 110, that the emulator 30 is not present.

The output signals of the NOR gates 130 may be used to control production core operations based on emulation logic inputs regardless of whether the signals are ever driven. If not driven, they will have no effect and are disabled. Otherwise, they operate as intended. For example, it may be desired to initiate a system reset from the emulation logic. The NOR gate is only enabled by the final output signal when the emulator circuit 30 is present, otherwise disabling the emulator reset signal.

In this manner the present invention provides a way to eliminate any and all floating nodes, and any DC current paths that would otherwise have been needed for pulldown or pullup devices used for these emulator signals when the emulator 30 is not present.

Note that the input to the first logic circuit 106 may only be driven high by the emulator circuit 30 and may only be pulled down by the weak pulldown device 108. However, when the output signal is floating, point x could possibly flip or jump high temporarily due to coupling effects from adjacent conductors, especially since the pulldown device must be weak to minimize power consumption. To avoid such a possibility, an optional safeguard circuit may be employed.

This safeguard circuit stores the output logic value from the first logic circuit 106 in a specific location (bit position) of a register 112, that is preferably a typical master/slave register, a latch, or any other type of storage device. The output of the register 112 bit will be low and override any spurious and sporadic false high values which may propagate to the input of the first logic circuit 106.

In addition such a register 112 provides a convenient place for recording the existence of the emulator 30. This allows code that has been written to be tested in the core 20 as if the emulator 30 were not present; this may be useful to ensure that the code is not dependent upon the emulator circuit 30 to properly operate. Alternatively, this bit may be employed in any appropriate manner by code or a program. The bit so employed may be part of a memory mapped register or a register that may be read and/or written to by an emulator processor, if present, or an external processor.

Figure 4:
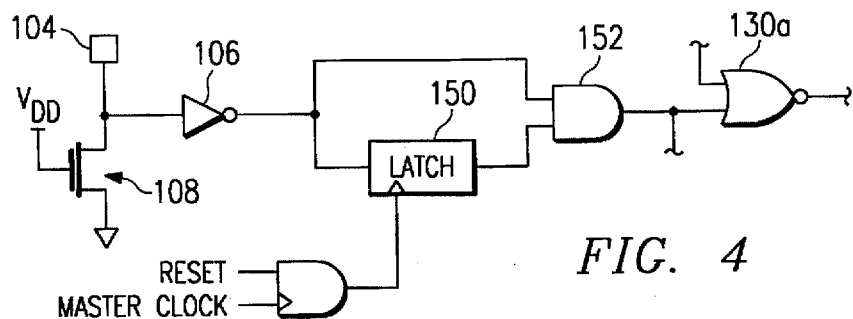
FIG. 4 depicts a simplified diagram of a presently preferred safeguard circuit of the present invention for use in an emulator system.

Referring now to FIG. 4, there may be seen a simplified diagram of a presently preferred safeguard circuit of the present invention for use in an emulator system. This circuit is a modification of the circuit of FIG. 3. The circuit of FIG. 4 includes a latch 150 for latching the value of the output signal from the first logic circuit 106. The value of the output signal from circuit 106 and latch 150 are compared by a second logic circuit 152 to avoid the spurious signals described earlier herein. The second logic circuit 152 is depicted as an AND gate, but clearly other types of logic circuits may be so employed.

Preferably the latch 150 is a preselected bit position in a register, preferably bit position 4 of a System Status Register, and provides a preferably read-only bit which specifies whether the emulation logic 30 is present. However, this latch 150 may be, and preferably is, a portion of register 112. This bit may be set by the logic shown in FIG. 4. However, this bit in register 112 may also be set or overridden by software to allow the output signal detected by the core 20 to signal the absence of the emulator 30, even when the emulator 30 is present. This may be accomplished by having an appropriate bit position of register 112 able to control logic circuit 106, or in any other convenient manner. This allows code that has been written to be tested in the core 20 as if the emulator 30 were not present; this may be useful to ensure that the code is not dependent upon the emulator circuit 30 to properly operate. The bit so employed may be part of a memory mapped register or a register that may be read and/or written to by an emulator processor, if present, or an external processor. Preferably, the contents of register 110 are accessible by at least an external processor.

Figure 5:
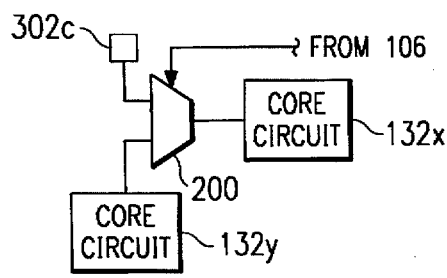
FIG. 5 depicts a simplified diagram of a presently preferred circuit of the present invention for use in the production core of an emulator system.

Referring now to FIG. 5, there may be seen a simplified diagram of a presently preferred circuit of the present invention for use in an emulator system. The circuit in FIG. 5 is preferably employed in production core 20. More particularly, it may be seen that there is a first core circuit 132y that provides its output as an input to a multiplexer 200.

Multiplexer 200 has a second input from an input pad 302c that serves to provide an emulator signal as an input to the multiplexer 200. Multiplexer 200 is controlled by a signal that corresponds to the emulator presence signal, such as, for example from circuit 106 of FIG. 3. That is, the multiplexer 200 is used to shift the input signal to circuit 132x between a core signal and an emulator signal depending upon the presence or absence of the emulator, or a corresponding bit value in a register, as noted earlier herein. In this manner the emulator presence signal may be used to control the supply of emulator signals or "normal" core signals to specific portions of the core circuits.

Figure 6:
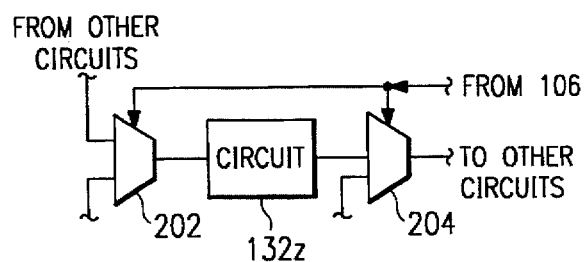
FIG. 6 depicts a simplified diagram of a presently preferred circuit of the present invention for use in the production core of an emulator system.

Referring now to FIG. 6, there may be seen a simplified diagram of a presently preferred circuit of the present invention for use in an emulator system. The circuit in FIG. 6 is preferably employed in production core 20. More particularly, it may be seen that there is a core circuit 132z that may be multiplexed into or out of a section of circuitry in core 20. That is, the two multiplexers 202, 204 are controlled by the emulator presence signal to insert or remove an addition circuit 132z into the core 20 to provide additional functionality to the core for special purposes. The input signal for the first of the two multiplexers 202 is a signal from other circuitry that is then supplied to the newly added circuit 132z. The input for the other multiplexer 204 is the output of circuit 132z. The other input signals to the two multiplexers 202, 204 may be normal functional signals, special or normal test signals, emulation control or test signals, or combinations thereof. For example, additional interrupt detection circuitry may be inserted in the normal interrupt logic chain in the emulation mode to allow for detection of additional interrupts. Similarly, breakpoint circuitry may be inserted into normal functional circuits to allow for breakpoint detection when in the emulation mode. Clearly, the emulator 30 provides a way to add more functionality to that existing in the core 20 under control of the emulator presence signal and/or detection circuits.

Referring again to FIG. 3, the core 20 may also have output pads 304 associated with a typical test access port that is used when the core is in its normal mode or test mode of operation. The emulator 30 may also have output pads 306 associated with a special emulator test access port. These test access ports may be employed to control and/or monitor activity within the core 20 and emulator 30 when in any normal, test, or emulation mode of operation.

Accordingly, it may be seen that these types of circuits may be used to provide two outputs, a first output corresponding to use of first test port and a second output corresponding to use of a second test port. In the normal mode the core 20 uses its normal output pins and its normal test port; in the emulation mode the core 20 may also use the pads that interconnect the core 20 with the emulator 30 and a second test port that may be on core 20 and/or emulator 30. A test signal may then be used to further shift or modify the operation of the core 20 when it is operating in the emulation mode.

The detecting and enabling circuits of the present invention may be used in each of a plurality of blocks of emulator circuits or core circuits, with each block corresponding to the foregoing description.

The present invention is capable of being implemented in software, hardware, or combinations of hardware and software. Although the present invention and its advantages have been described in detail, it should be understood that various changes, substitutions and alterations may be made herein without departing from the spirit and scope of the invention, as defined in the appended claims.

What is claimed is:

1. An integrated circuit, comprising:
   a core circuit for performing a plurality of functions;
   sensing means for sensing when an optional circuit is included as part of said integrated circuit;
   interconnect means for coupling signals only from said optional circuit to said core circuit;
   receiving means connected to said core circuit to receive input signals on said interconnect means from said optional circuit when said optional circuit is present in said integrated circuit, wherein said receiving means is disabled by said sensing means when said sensing means determines that said optional circuit is not present in said integrated circuit so that false signals on said interconnect means will not be coupled to said core circuit; and
   wherein said sensing means further comprises:
   safeguard circuit connected to said sensing means, said safeguard circuit operable to latch a value of a sense signal which indicates the presence of said optional circuit in response to a preselected signal so that false sense signals are not output from said sensing means.

2. The integrated circuit of claim 1, wherein said safeguard circuit is connected to said core circuit so that said latched sense value can be interrogated by a software program operable on said core circuit.

3. The integrated circuit of claim 1, wherein said safeguard circuit is connected to said core circuit so that said latched sense value can be overridden by a software program operable on said core circuit to falsely indicate said optional circuit is not present.

4. The integrated circuit of claim 1, further comprising:
   said optional circuit included in said integrated circuit and connected to said interconnect means, wherein said receiving means is enabled by said sensing means to pass signals on said interconnect means from said optional circuit to said core circuit.

5. An integrated circuit, comprising:
   a core circuit for performing a plurality of functions;
   sensing means for sensing when an optional circuit is included as part of said integrated circuit;
   interconnect means for coupling signals only from said optional circuit to said core circuit;
   receiving means connected to said core circuit to receive input signals on said interconnect means from said optional circuit when said optional circuit is present in said integrated circuit, wherein said receiving means is disabled by said sensing means when said sensing means determines that said optional circuit is not present in said integrated circuit so that false signals on said interconnect means will not be coupled to said core circuit; and
   a multiplexor circuit with a first input connected to a first portion of said core circuit and an output connected to a second core circuit and having a second portion of said input connected to said interconnect means for alternatively coupling a signal on said interconnect means from said optional circuit to said second portion of said core circuit, wherein said multiplexor circuit is controlled by said sensing means so that when said sensing means determines that said optional circuit is not present in said integrated circuit said second input will be disabled and said first portion of said core circuit will be coupled to said second portion of said core circuit so that a false signal on said interconnect means will not be coupled to said second portion of said core circuit.

6. An integrated circuit, comprising:

a core circuit for performing a plurality of functions;

sensing means for sensing when an optional circuit is included as part of said integrated circuit;

interconnect means for coupling signals only from said optional circuit to said core circuit;

receiving means connected to said core circuit to receive input signals on said interconnect means from said optional circuit when said optional circuit is present in said integrated circuit, wherein said receiving means is disabled by said sensing means when said sensing means determines that said optional circuit is not present in said integrated circuit so that false signal on said interconnect means will not be coupled to said core circuit; and a multiplexor circuit with a first input connected to a preselected source and an output connected to a first portion of said core circuit and having a second input connected to a second portion of said core circuit for alternatively coupling a signal from said second portion of said core circuit to said first portion of core circuit, wherein said second multiplexor circuit is controlled by said sensing means so that when said sensing means determines that said optional circuit is not present in said integrated circuit said second input will be disabled and said preselected source will be coupled to said first portion of said core circuit so that said second portion of said core does not affect the functions performed by said first portion of the core circuit.

7. An integrated circuit, comprising:

a core circuit for performing a plurality of functions;

sensing means for sensing when an optional circuit is included as part of said integrated circuit;

interconnect means for coupling signals only from said optional circuit to said core circuit;

receiving means connected to said core circuit to receive input signals on said interconnect means from said optional circuit when said optional circuit is present in said integrated circuit, wherein said receiving means are disabled by said sensing means when said sensing means determines that said optional circuit is not present in said integrated circuit so that false signals on said interconnect means will not be coupled to said core circuit; and wherein said sensing means further comprises:

a first logic circuit having a sense input connected to said interconnect means and having a sense output signal which indicates the presence of said optional circuit; and a low power device connected to said sense input to bias said logic circuit so that said sense output indicates said optional circuit is not present when said optional circuit is not included in said integrated circuit.

8. The integrated circuit of claim 7, further comprising:

said optional circuit included in said integrated circuit and having a "presence" signal connected to said interconnect means, wherein said presence signal is coupled to said sense input to override said low power device, whereby said sense output indicates said optional circuit is present.

9. The integrated circuit of claim 7, wherein:

said interconnect means further comprise a plurality of conductive interconnect paths; and said receiving means further comprise a plurality of second logic circuits with each such circuit having a first input individually connected to one of said conductive paths, having a second input connected to said sense output, and having an output connected to a portion of said core circuit.

* * * * *